United States Patent [19]
Motley et al.

[11] 3,935,535
[45] Jan. 27, 1976

[54] FAST EQUALIZATION ACQUISITION FOR AUTOMATIC ADAPTIVE DIGITAL MODEM

[75] Inventors: David M. Motley, Santa Ana; King Y. Cheng, Tustin, both of Calif.

[73] Assignee: Hycom Incorporated, Irvine, Calif.

[22] Filed: Sept. 9, 1974

[21] Appl. No.: 504,440

[52] U.S. Cl. .................. 325/324; 325/42; 333/18
[51] Int. Cl.² ............................................ H04B 1/10
[58] Field of Search ............... 325/42, 60, 323–326, 325/472–477; 333/18

[56] References Cited
UNITED STATES PATENTS
3,787,762   1/1974   Sato ..................................... 325/42

Primary Examiner—Albert J. Mayer
Attorney, Agent, or Firm—Gordon L. Peterson

[57] ABSTRACT

A transmitter transmits data through a communication channel to a receiver and the communication channel provides the data with delay and attenuation distortion. The receiver includes an equalization network having taps with multiplying coefficients for correcting the delay and attenuation distortion of the data. In response to a special sequence of the data, either specially generated by the transmitter or detected in random data, the receiver generates signals for updating the multiplying coefficients of the taps and these signals are introduced to the equalization network through a gate enabled by a special sequence detection network. This apparatus provides for the adjustment of the equalization taps in an extremely short period of time such as 5.83 milliseconds.

19 Claims, 4 Drawing Figures

FIG. 1.

FIG. 2. (TRANSMITTER -33-)

FAST EQUALIZATION ACQUISITION FOR AUTOMATIC ADAPTIVE DIGITAL MODEM

BACKGROUND OF THE INVENTION

1. Field of the Invention

This invention relates generally to apparatus for transmitting data between distant locations and more specifically to automatic digital modems which transmit data on telephone lines.

2. Description of the Prior Art

When data, such as inventory data, is to be transmitted from a first location to a second location, it is a common practice to provide a modulator-demodulator or modem at each of the locations. Telephone lines are commonly used to provide a communication channel between the modems. The modem at the first location, acting as a transmitter, modulates the data and transmits an analog signal through the communication channel to the modem at the second location. The modem at the second location, acting as a receiver, demodulates the analog signal to reproduce the data transmitted.

The characteristics of the communication channel, such as a telephone line, typically cause significant attenuation and delay distortion in the analog signal so that when the analog signal is demodulated, the data is inaccurate. To correct for these distortions, the receiver at the second location is typically provided with an equalization network including at least one equalizer having taps with variable multiplying coefficients. By sequentially multiplying the data in the equalizer, the intersymbol interference can be reduced to correct for the delay and attenuation distortion caused by the communication channel.

In the past, the incoming data has been random or unknown so that the equalizer has had to learn the overall impulse response of the channel by correlating the incoming symbols with their expected values. This correlation has produced error signals which have been used to adjust the multiplying coefficients of the taps in the equalizers. This procedure is disclosed and claimed in applicants' copending application for an EQUALIZER, Ser. No. 405,290 filed on Oct. 11, 1973, now U.S. Pat. No. 3,906,347 and assigned of record to the assignee of record of the present application. Although this procedure works well for updating the multiplying coefficients of the equalizer, it is particularly time consuming for use in initially setting the taps. Until the taps are correctly adjusted, any data transmitted may be erroneous so that a tedious equalization procedure can significantly reduce the data throughput of the system.

This limitation is particularly apparent in multipoint communication networks including a master station and a plurality of slave stations. The receiver at the master station must adapt to the characteristics of a different telephone channel each time it communicates with a different one of the slave stations. In a system including 20 slave stations, a single polling of the network could consume as much as forty seconds in merely adjusting the equalizer taps.

In the following articles it was disclosed that the initial setting of the equalization taps could be speeded up by transmitting isolated impulses.

Chang, R. W., "A New Equalizer Structure for Fast Start-Up Digital Communication", B.S.T.J., Volume 50, Number 6, July–August 1971.

Chang, R. W. and Ho, E. Y., "On Fast Start-Up Data Communications Systems Using Pseudo-Random Training Sequences," B.S.T.J., Volume 51, Number 9, November 1972.

Due to the complexity of implementation hardware, the methods disclosed in these articles are only of academic interest and not applicable in any practical modems. In order to transmit the isolated impulses, the data transmission must first be stopped and then special circuitry must be used to both modulate and demodulate the signal. Any stoppage in the transmission of data of course significantly reduces the data throughput of the system. This problem is compounded in a multipoint communication network since the transmission of isolated impulses to correct the equalization of a receiver at a single slave station would mean that the transmission or data to all of the slave stations would be stopped.

SUMMARY OF THE INVENTION

In accordance with the present invention a special sequence of data is transmitted to provide in the receiver a known sequence of partial response data symbols. It has been found that these data symbols can be used to derive the impulse response of the receiver, and this impulse response in turn can be used to adjust the taps of the equalizer. Of particular importance is that the entire equalization procedure can be accomplished in an interval of time corresponding to seven bauds which in a preferred embodiment is equivalent to 5.83 milliseconds. This significant reduction in time is of particular advantage in a multipoint communication network including for example twenty slave stations, wherein a single polling sequence can be completed in only 116.6 milliseconds. This is a 97% reduction in the equalization adaptation time compared with the practical methods of the prior art. This significant reduction in adaptation time occurs primarily as a result of transmission of a special sequence of data which is detected in the receiver and which facilitates the computation of impulse response characteristics.

This special data sequence is to be distinguished from the transmission of isolated impulses as taught by the articles cited above. Special circuitry is not required to modulate and demodulate the special data sequence, rather the data in the special sequence can be processed in the same manner as the normal data.

Furthermore, the special data sequence is such that it occurs with a high degree of probability even in random data signals. Thus, even without providing a special transmission of the data sequence, the sequence can be detected in random data and used to update the multiplying coefficients of the equalizer taps. In a particular embodiment, the special sequence may occur with a probability of 50% in each one thousand bauds. This provides sufficient updating capability to track the relatively slow, usually diurnal, equalization error.

These and other features and advantages of the present invention will be more apparent with a description of the specific embodiments discussed in conjunction with the following drawings.

DESCRIPTION OF PREFERRED EMBODIMENTS

Figure 1:
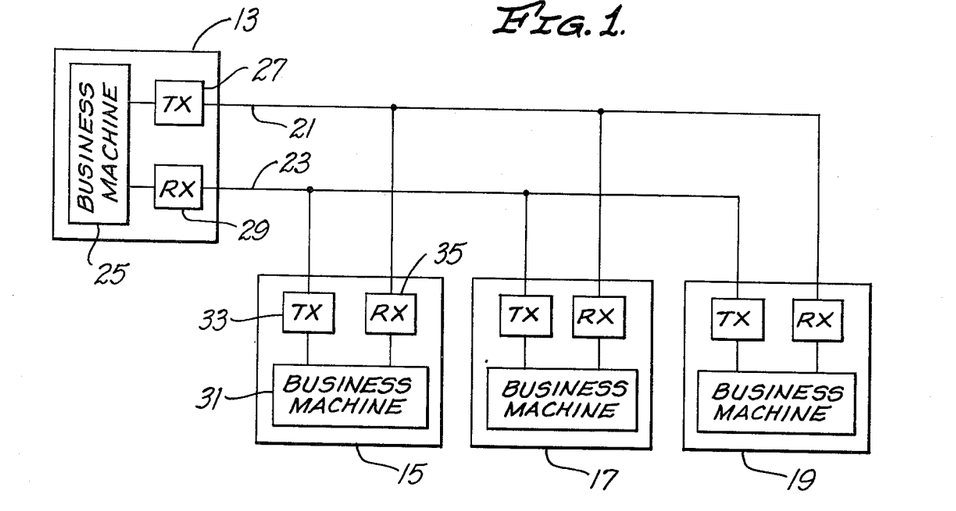
FIG. 1 is a block diagram of a multipoint communication network including a master station and a plurality of slave stations each including a transmitter and a receiver having the fast equalization characteristics associated with the present invention.

A multipoint communication network as illustrated in FIG. 1 and designated generally by the reference numeral 11. The communication network 11 includes a master station 13 and a plurality of slave stations 15, 17, and 19 which transmit information over telephone lines 21 and 23. The master station 13 typically includes a business machine 25, and a modem including a transmitter 27 and a receiver 29. The business machine 25 interfaces with the telephone line 21 through the transmitter 27, and interfaces with the telephone lines 23 through the receiver 29.

In this type of communication network 11, each of the slave stations 15, 17, and 19 includes a business machine 31 and a modem including a transmitter 33 and a receiver 35. At each of the slave stations 15, 17, and 19, the business machine 31 interfaces with the telephone lines 23 through the associated transmitter 33, and interfaces with the telephone lines 21 through the associated receiver 35. Although only three slave stations 15, 17, and 19 are illustrated in FIG. 1, it will be understood that the communication network 11 can include any number of slave stations.

The telephone lines 21 and 23 may be those designated by the Bell System as unconditional telephone channels. These channels are lease lines which include a pair of wires for each of the telephone lines 21 and 23. The modems of each of the master and slave stations 13, 15, 17, and 19 can be of the type disclosed and claimed in applicant's copending application for an AUTOMATIC DIGITAL MODEM, Ser. No. 324,657, filed on Jan. 18, 1973, and assigned of record to the assignee of record of the present application.

The procedure for transmitting data in such a communication network 11 begins when the master station 13 selectively addresses or polls each of the slave stations 15, 17, and 19 to determine if there is any data to be transmitted. If the business machine 31 in one of the slave stations, such as the station 15, has no data to send, it typically responds to the poll by transmitting a "not acknowledge" signal. In the American Standard Code for Information Interchange, such a signal is encoded NAK. Even though this message may be very short, the receiver 29 at the master station 13 must still adapt to the characteristics of the telephone lines 23 before it can accurately receive this message or any data. These characteristics of the telephone lines 23 will vary with each of the slave stations 15, 17, and 19.

In the past, each adaptation of the receiver 29 to the characteristics of a particular transmitter 33 in the slave stations 15, 17, and 19 has taken a considerable amount of time, such as two seconds. In networks including as many as 20 slave stations for example, the total adaptation time has been as great as 40 seconds. During this period of time no data has been transmitted, and as a consequence, the throughputs of the prior art systems has been significantly reduced.

A procedure is known for rapidly adapting the receiver 29 to the timing and phase characteristics of the telephone lines 23. The present invention is concerned with the rapid equalization of the delay and attenuation distortion which occurs in the data signal due to the characteristics of the telephone lines 23.

Before proceeding with a detailed discussion of the fast equalization procedure, it is desirable to discuss the characteristics of the signals in the transmitter 33 and the receiver 29. The transmitter 33 is shown in greater detail in FIG. 2 between the business machine 31 and the telephone lines 23. An encoder 37 is connected to the business machine 31 and adapted to receive straight binary digitized data therefrom at a particular rate such as 2400 bits per second (bps) or 4800 bps. Within the encoder 37, the incoming data is randomized, differentially encoded, and separated into an in-phase or I channel and a quadrature or Q channel.

Figure 2:
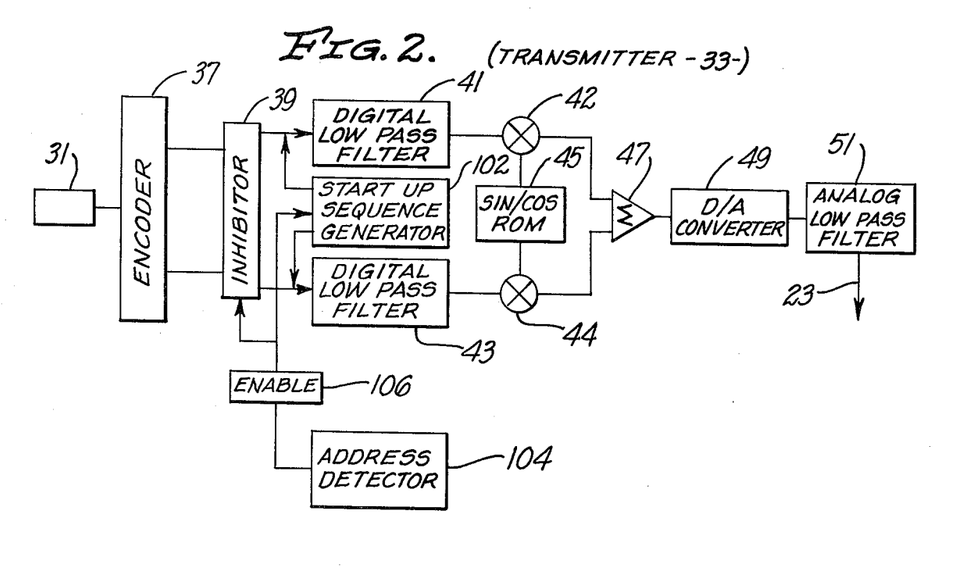
FIG. 2 is a block diagram of one of the transmitters illustrated in FIG. 1.

At the output of the encoder 37, the signals in the I and Q channels include digital words or symbols $dI_j$ and $dQ_j$, respectively, where the sub $j$ implies the jth data symbol. Each of the data symbols $dI_j$ and $dQ_j$ expresses one of a plurality of data levels, the number of which depends on the speed of operation. For example, if data is being transmitted at a rate of 2400 bps, the digital symbols will typically express levels of $\pm 1$. For 4800 bps operation, the symbols will typically express one of four levels, such as $\pm 3$ and $\pm 1$. These digital symbols $dI_j$ and $dQ_j$ will typically occur at the baud rate of 1200 per second so that the interval of time between adjacent symbols is $1/1200$ seconds. This interval is commonly referred to as the baud interval. At the baud rate of 1200 symbols per second, the throughput of the modem is 1200 symbols per second, times two bits per symbol, times two channels, or 4800 bits per second.

During normal operation, the data symbols $dI_j$ and $dQ_j$ are introduced through an inhibitor 39 to a pair of digital lowpass filters 41 and 43 in the I and Q channels respectively. The purpose of the inhibitor 39 will be discussed in greater detail below.

The filters 41 and 43 can be transversal filters comprising a series of delay stages and means for sequentially multiplying each of the data symbols $dI_j$ and $dQ_j$ by a plurality of tap coefficients each of which is associated with one of the stages. The tap coefficients of the filters 41 and 43 will typically have fixed values which can be set, in combination with the tap coefficients of similar filters in the receiver 29, to provide the system with (1,1) partial response signaling, which is discussed below. The products resulting from the multiplication in the filters 41 and 43 are summed to provide the output of the respective filters 41 and 43. These digital signals can be expressed as follows in the respective I and Q channels:

$$WI_j = \sum_{-k_1}^{k_2} dI_{j+k}\, gI_{-k}$$

$$WQ_j = \sum_{-k_1}^{k_2} dQ_{j+k}\, gI_{-k}$$

Equations (1)

where $gI_{-k}$ are the multiplying coefficients of taps in the filters 41 and 43. As used herein the subscript $k$ signifies positional notation. In Equation 1, the positional notation indicates the relative positions of various taps in a series of taps defining the filters 41 or 43.

For example, the taps in the series might have the values $gI_{k_2} \ldots gI_{+2}, gI_{+1}, gI_0, gI_{-1}, gI_{-2} \ldots gI_{-k_1}$.

After being appropriately filtered, the signals can be introduced to multipliers 42 and 44 in the respective I and Q channels wherein they are multiplied at a carrier frequency such as 1600 Hertz by digital quantities from a sine/cosine ROM 45. These modulated signals can then be combined in an adder 47, converted to an analog format in a digital-to-analog converter 49, and smoothed by an analog lowpass filter 51. In its analog format, the resulting signal transmitted on the telephone lines 23 can be expressed as follows:

$$s(t) = WI_j \cos\omega_c t + WQ_j \sin\omega_c t \qquad \text{(Eq. 2)}$$

where:

$WI_j$ and $WQ_j$ are the $j$th data symbols of the in-phase and quadrature components of the baseband signal; and $\omega_c$ is the radian frequency on the sine/cosine ROM 45.

The signal $s(t)$ transmitted on the telephone lines 23 may be altered to a greater or lesser extent, depending upon the quality of the lines 23. For example, the lines 23 may cause the entire data spectrum to shift; this is typically referred to as frequency offset. Telephone lines of poor quality may also produce phase jitter so that the carrier phase of the received signal varies in a generally sinusoidal manner with respect to the carrier phase of the transmitted signal. There may also be an initial difference between the carrier phase of the transmitter 33 and the carrier phase of the receiver 29. This is commonly referred to as phase offset.

Of particular interest to the present invention is the asymmetrical and symmetrical delay and attenuation distortion which is produced in the transmitted signal by telephone lines of poor quality. This distortion is based on the treatment telephone lines 23 give each particular frequency in the spectrum with respect to the carrier frequency. For example, some of the frequencies in the spectrum will experience a greater delay than other frequencies in the spectrum. Similarly, the telephone lines 23 may attenuate some frequencies more than others.

It is, of course, desirable that the receiver 29 compensate for all of these undesirable characteristics before any data is transmitted. This will minimize the error between the signal received and the signal transmitted.

To emphasize the distortion of the transmitted signal by the telephone lines 23, the signal at the input to the receiver 29 is designated $s'(t)$. This signal $s'(t)$ is substantially the transmitted signal $s(t)$ plus all channel distortion. In addition to the phase and frequency offset, and phase jitter, the channel distortion will include gaussian and impulse noise as shown below:

$$s'(t) = \{WI_j \cos [\omega_c t + \phi(t)] + WQ_j \sin [\omega_c t + \phi(t)]\} * c(t) + n(t) \qquad \text{(Eq. 3)}$$

where:

$\phi$ is the phase error produced by the telephone lines 23;

$n(t)$ is the line noise, both gaussian and impulse;

* is convolution integral; and $c(t)$ is the channel impulse response, a function of the attenuation and delay distortion.

Figure 3:
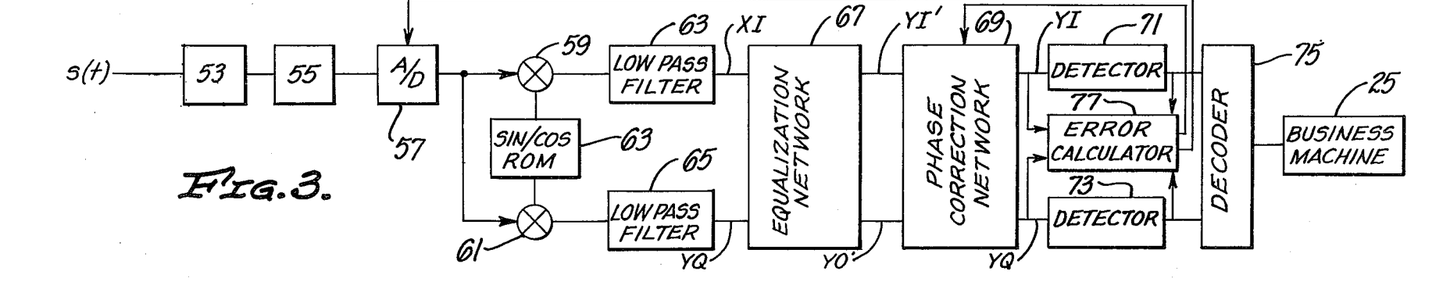
FIg. 3 is a block diagram of one of the receivers shown in FIG. 1 and illustrating an equalization network included in the fast equalizer of the present invention.

Referring now to FIG. 3, it will be noted that the input analog signal $s'(t)$ from the telephone lines 23 is initially introduced through data access equipment 53 is an automatic gain control 55. An analog-to-digital converter or sampler 57 is provided to sample the incoming analog signal at a rate, such as 4800 times per second, corresponding to some multiple of the symbol rate of the transmitter 33.

This general type of timing control is disclosed and claimed in applicant's copending application Ser. No. 405,574 entitled DIGITAL DATA MODEM WITH AUTOMATIC TIMING RECOVERY AND CONTROL filed on Oct. 11, 1973, now U.S. Pat. No. 3,890,398 and assigned of record to the assignee of record of the present application.

Following the sampler 57 and throughout the remainder of the receiver 29, all signals in the embodiment have a digital format.

The digital signal from the sampler 57 can be separately multiplied in each of a pair of multipliers 59 and 61 by quantities stored in a sine/cosine ROM 63. In this manner, the signal can be non-coherently demodulated and separated into an in-phase or I channel and a quadrature or Q channel respectively.

From the multipliers 59 and 61, the signals in the I and Q channels can be introduced to respective digital lowpass filters 63 and 65 to select and to shape the baseband from the demodulated signal. It is the filters 63 and 65 in the receiver 29 which were previously referred to as being tuned with the filters 41 and 43 in the transmitter 33 to provide the (1,1) partial response signaling.

Ideally, the (1,1) partial response signaling provides a seven-level signal at the output of each of the lowpass filters 63 and 65. In terms of the input data symbols $dI_j$, $dQ_j$, the seven-level partial response signals, which will be designated $DI_j$ and $DQ_j$ can be expressed as follows:

$$DI_j = dI_j + dI_{j-1}$$
$$DQ_j = dQ_j + dQ_{j-1} \qquad \text{(eqs. 4)}$$

If the signals from the filters 63 and 65 were ideal, the seven-level signals $DI_j$ and $DQ_j$ could be detected at this point and decoded to reproduce the data transmitted by the transmitter 33.

It is a primary purpose of the receiver 29 to correct the phase error and channel distortion so that the seven-level symbols $DI_j$ and $DQ_j$ can be detected to reproduce the transmitted data. Since the signals at the outputs of the lowpass filters 63 and 65 will typically not be ideal but will rather be polluted by channel distortions, phase error, and other forms of noise, they will be designated by the notation XI and XQ. In terms of the incoming signal $s'(t)$ these preequalized signals can be expressed as follows:

$$XI = [s'(t) \cos(\omega_c t)] * gI(t)$$
$$XQ = [s'(t) \sin(\omega_c t)] * gI(t) \qquad \text{(Eqs. 5)}$$

where:

* is convolution integral; and $gI(t)$ is the impulse response of the filters 63 and 65.

Following the filters 63 and 65, these two baseband signals XI and XQ in the I and Q channels respectively can be introduced to an equalization network 67. This network 67 corrects for the asymmetrical as well as the symmetrical delay and attenuation distortion of the telephone lines 23. At the output of the equalization network 67, the signals in the I and Q channels, which will be designated $YI'$ and $YQ'$ respectively, can be expressed as follows:

$$YI'_j = \sum_n CI_n XI_{j-n} - \sum_n CQ_n XQ_{j-n}$$
$$YQ'_j = \sum_n CI_n XQ_{j-n} + \sum_n CQ_n XI_{j-n} \qquad \text{(Equations 6)}$$

where:

CI and CQ are multiplying coefficients of equalizers in the equalization network 67, and n is positional notation signifying the maximum number of stages in each of the equalizers.

This equalization network 67 will be described in greater detail below.

At the output of the equalization network 67, the equalized signals YI' and YQ' can be introduced to a phase correction network 69 which corrects for phase and frequency offset and phase jitter. The phase correction network 69 can be of the type disclosed and claimed in applicant's copending application for a PHASE LOCK LOOP, Ser. No. 376,464, filed on July 5, 1973, now abandoned and assigned of record to the assignee of record of the present application. At the output of the phase correction network 69, the equalized and phase corrected signals, which are typically designated YI and YQ in the respective I and Q channels, can be expressed as follows:

$$YI_j = YI'_j \cos \phi' - YQ'_j \sin \phi'$$
$$YQ_j = YQ'_j \cos \phi' + YI'_j \sin \phi' \quad \text{(Eqs. 7)}$$

In this particular embodiment, the signals YI and YQ will have been equalized and phase corrected at the output of the phase correction network 69. Thus, most of the distortion which prevents the preequalized signals XI and XQ from being ideal will have been removed. It follows that the signals YI and YQ are substantially the ideal seven-level symbols $DI_j$ and $DQ_j$. These symbols can be detected by introducing the signals YI abd YQ to threshold detectors 71 and 73 in the respective I and Q channels. The detectors 71 and 73 determine which of the seven possible levels the $YI_j$ and $YQ_j$ signals most closely approximate. The seven-level symbols $DI_j$ and $DQ_j$ are then provided at the output of the respective detectors 71 and 73. A decoder 75 decodes the seven-level symbols $DI_j$ and $DQ_j$ to provide the four-level data symbols $dI_j$ and $dQ_j$ in accordance with the following equations:

$$dI_j = DI_j - dI_{j-1}$$
$$dQ_j = DQ_j - dQ_{j-1} \quad \text{(previously designated Equations 4)}$$

The decoder 75 also decodes the four-level symbols $dI_j$ and $dQ_j$ to provide the binary data which is then introduced to the business machine 25 in the master station 13.

As disclosed in applicant's copending application for an AUTOMATIC DIGITAL MODEM, Ser. No. 324,657, previously mentioned, an error calculator 77 can provide system error signals EI and EQ. These signals are typically used during normal operation for updating at least the sampling rate of the sampler 57 and the phase correction of the network 69. In accordance with the present invention the equalization network 67 can be updated in a manner discussed below.

For symbols transmitted at the ideal Nyquist rate of $2\omega$ per second over an ideal channel having a bandwidth of $\omega$ Hertz, the filters 41, 43, 63, and 65 can be tuned to provide composite signal shaping characteristics of:

$$H(\omega) = 2 T \cos \frac{T\omega}{2}$$

for $$(\omega) \leq \frac{\pi}{T}$$

and $H(\omega) = 0$ for $$(\omega) \geq \frac{\pi}{T}$$

where T is the symbol period.

In the absence of channel distortion, this provides the overall system with an impulse response of $$h(t) = \frac{4}{\pi} \left[ \frac{\cos(\pi t/T)}{1 - 4t^2/T^2} \right] \quad \text{(Equation 9)}$$

which can be shown to be unity for $t = \pm T/2$ and 0 for all other sampling times. Thus samples taken at the times $+T/2$ and $-T/2$ both will have an impulse response of unity.

This type of signaling, which is commonly referred to as (1,1) partial response signaling, is particularly desirable in the present invention since it permits the seven-level symbols $DI_j$ and $DQ_j$ to be expressed in terms of the four-level data symbols $dI_j$ and $dQ_j$ as shown by Equation 4. It follows that the only intersymbol interference in the seven-level symbols $DI_j$ and $DQ_j$ is that associated with the four-level symbols $dI_{j-1}$ and $dQ_{j-1}$ of the preceding baud interval. This relationship facilitates decoding of the seven-level symbols in the manner previously discussed.

At the input to the equalization network 67, the signals in the respective I and Q channels can be expressed in terms of the data symbols $dI_j$ and $dQ_j$ as follows:

$$XI = \sum_i dI_{j-i} hI_i + \sum_i dQ_{j-i} hQ_i$$
$$XQ = \sum_i dQ_{j-i} hI_i - \sum_i dI_{j-i} hQ_i \quad \text{(Equations 10)}$$

where:

hI and hQ are the sample values of the equivalent baseband in-phase and quadrature impulse response characteristics of the I and Q channels resulting from filter shaping and channel distortion; and i is positional notation representing the maximum number of significant terms of the hI and hQ sample values.

Since the input data symbols $dI_j$ and $dQ_j$ can be expressed in terms of the partial response data symbols $DI_j$ and $DQ_j$ respectively, it is apparent that the preequalized signals XI and XQ can also be expressed in terms of the partial response data signals $DI_j$ and $DQ_j$ as follows:

$$XI_j = \sum_i DI_{j+i} pI_{-i} + \sum_i DQ_{j+i} pQ_{-i}$$
$$XQ_j = \sum_i DQ_{j+i} pI_{-i} - \sum_i DI_{j+i} pQ_{-i} \quad \text{(Equations 11)}$$

where i is positional notation representing the maximum number of significant terms of the pI and pQ sample values described below.

It can be seen from the similarity of Equations 10 and 11 that the h values in Equation 10 correspond to the response $h(t)$ of the receiver 29 to an impulse in the $s'(t)$ signal which provides the symbols $dI_j$ and $dQ_j$. In contrast the p values in Equations 11 correspond to a response $p(t)$ to an impulse in a signal providing the symbols $DI_j$ and $DQ_j$.

If the partial response data symbols DI and DQ can be expressed in terms of the input data symbols $dI$ and $dQ$, as shown in Equations 4, it follows that the impulse response $p$ values can also be expressed in terms of the impulse response $h$ values:

$$pI_{-i_1} = hI_{-i_1}$$
$$pI_{-i_1+1} = hI_{-i_1+1} - pI_{-i_1}$$

and, in general, $$pI_{-i_1+i} = hI_{-i_1+i} - pI_{-i_1+i-1}$$

similarly, in general, (Eqs. 12)

$$pQ_{-i_1} = hQ_{-i_1}$$
$$pQ_{-i_1+i} = hQ_{-i_1+i} - pQ_{-i_1+i-1}$$

Since the $XI_j$ and $XQ_j$ signals at the input to the equalization network 67 can be expressed in terms of the input data symbols $dI_j$ and $dQ_j$ (Equations 10), it follows that the $YI'_j$ and $YQ'_j$ signals can also be expressed in terms of these quantities:

$$YI'_j = \sum_k dI_{j+k} \, lI_{-k} - \sum_k dQ_{j+k} \, lQ_{-k}$$

$$YQ'_j = \sum_k dQ_{j+k} \, lI_{-k} + \sum_k dQ_{j+k} \, lQ_{-k}$$

(Equations 13)

where:

$lI$ and $lQ$ are the sample values of the equivalent baseband in-phase and quadrature impulse response characteristics of the $I$ and $Q$ channels resulting from not only filter shaping and channel distortion but also equalization; and $k$ is the positional notation representing the maximum number of significant terms of the $I$ and $Q$ sample values.

If equalization is considered, Equations 13 can also be rewritten in terms of the data symbols $DI_j$ and $DQ_j$ and samples of a theoretical impulse response $m(t)$. Thus the equalized signals can also be expressed as:

$$YI'_j = \sum_k DI_{j+k} mI_{-k} - \sum_k DQ_{j+k} mQ_{-k}$$

$$YQ'_j = \sum_k DQ_{j+k} mI_{-k} + \sum_k DI_{j+k} mQ_{-k}$$

(Equations 14)

where:

$mI$ and $mQ$ are the sample values of the equivalent baseband inphase and quadrature impulse response characteristics of the $I$ and $Q$ channels resulting from not only filter shaping and channel distortion but also equalization; and $k$ is positional notation respresenting the maximum number of significant terms of the $mI$ and $mQ$ sample values.

It can be seen from the similarity of Equations 13 and 14 that the $m$ values correspond to a response to an impulse in a signal providing the partial response symbols $DI_j$ and $DQ_j$.

As was the case with the $h$ values and $p$ values it can also be shown that the $m$ values and $l$ values have in general the following relationship:

$$mI_{-k_1+k} = lI_{-k_1+k} - mI_{-k_1+k}$$
$$mQ_{-k_1+k} = lQ_{-k_1+k} - mQ_{-k_1+k-1}$$

(Eqs. 15)

The updating of the sampler 57 and the phase correction network 69 can be accomplished during normal operation in the manner disclosed in applicant's copending application for an AUTOMATIC DIGITAL MODEM, Ser. No. 324,657, previously mentioned. The present invention is concerned with the adjusting of the characteristics of the equalization network 67, particularly during the start-up period following the polling of a particular slave station, such as the station 15, and prior to the transmission of data. It will be shown that this adjusting technique can also be beneficially used to update the characteristics of the equalization network 67 even during normal operation.

Figure 4:
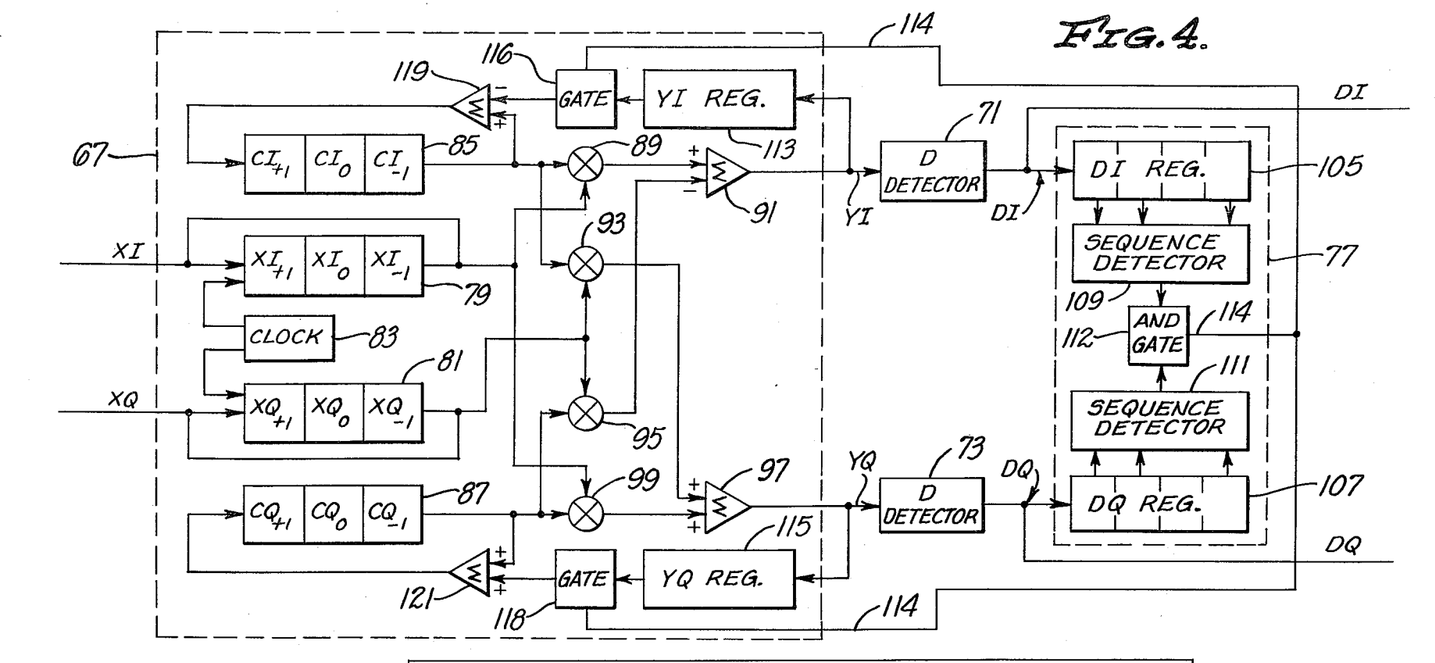
FIG. 4 is a block diagram of a portion of the receiver of FIG. 3 showing the equalization network in greater detail and also illustrating a special sequence detector included in the present invention.

The equalization network 67 is illustrated in greater detail in FIG. 4 along with the detectors 71 and 73, and a special data sequence data detection network 77. It will be understood that the phase correction network 69 may either preceed or follow the equalization network 67 in a particular system. Furthermore, in the following discussion it will be assumed that the timing and phase of the receiver 29 are accurate. For this reason, the phase correction network 69 shown in FIG. 3 is not illustrated in FIG. 4 so that the signals YI and YQ appear at the output of the equalization network 67.

In a preferred embodiment of the present invention, the equalization network 67 includes a circulating register 79 which receives a plurality such as three, of the symbols $XI_j$ from the signal XI. These data symbols are illustrated in FIG. 4 to include the symbols $XI_{+1}$, $XI_0$, and $XI_{-1}$. A circulating register 81 is also provided in the network 67 to receive a plurality of the symbols $XQ_j$ in the XQ signal. These symbols are illustrated to include the symbols $XQ_{+1}$, $XQ_0$, and $XQ_{-1}$. It will be understood that the number of symbols stored in the registers 79 and 81 will vary with different embodiments of the invention. Actually the registers 79 and 81 will typically provide for the circulation of six, 10, or even 20 symbols. However the three symbols illustrated in each of the registers 79 and 81 will facilitate a discussion of the present invention.

In each baud interval, a clock 83 provides an extra clock pulse to the circulating registers 79 and 81 to shift the data in the registers one stage to thereby admit a new symbol $XI_j$ or $XQ_j$ to the respective registers 79 and 81.

The equalization network 67 also includes circulating registers 85 and 87 which provide the taps or multiplying coefficients $CI_n$ and $CQ_n$ respectively. The number of taps or multiplying coefficients in the registers 85 and 87 will typically be equal to the number of symbols stored in the associated registers 79 and 91. Thus in the embodiment illustrated, the register 85 includes the three taps or multiplying coefficients $CI_{+1}$, $CI_0$, and $CQ_{-1}$.

During each baud interval, the symbols $XI_j$ and the multiplying coefficients $CI_n$ are circulated completely and sequentially multiplied in a multiplier 89. This provides in a single baud interval the in-phase products $CI_{+1}(XI_{-1})$, $CI_0(XI_0)$, and $CI_{+1}(XI_{-1})$. These in-phase products are introduced to an accumulator and differential adder shown at 91. The $XQ_j$ symbols are also circulated in each baud interval and introduced to multipliers 93 and 95. In the multiplier 93, the $XQ_j$ symbols are sequentially multiplied by the multiplying coefficient $CI_n$ from the register 85. This provides quadrature products $CI_{+1}(XQ_{-1})$, $CI_0(XQ_0)$, and $CI_{+1}(XQ_{-1})$ which are introduced to an accumulator and adder 97. In the multiplier 95, the $XQ_j$ symbols are correlated with the multiplying coefficient $CQ_n$ and the resulting products are introduced to the negative terminal of the differential adder 91. Finally, a multiplier 99 correlates the $XI_j$ symbols from the register 79 with the $CQ_n$ multiplying coefficients from the register 87, and the resulting quadrature products are introduced to the adder 97. In this manner, the adders 91 and 97 provide during each baud interval the following signals:

$$YI'_j = \sum_n CI_n XI_{j-n} - \sum_n CQ_n XQ_{j-n}$$

$$YQ'_j = \sum_n CI_n XQ_{j-n} + \sum_n CQ_n XI_{j-n}$$

(previously designated Equations 6)

Assuming there is perfect phase correction, the signals YI′ and YQ′ will be the signals YI and YQ as previously defined. These signals YI and YQ can then be detected in the detectors 71 and 73 in the manner previously discussed.

Since the $XI_j$ and $XQ_j$ signals can be expressed in terms of the $h$ values (Equations 10), and the $YI_j$ and $YQ_j$ signals can be expressed in terms of the $l$ values (Equations 13), it follows from Equation 6 that the $h$ values and the $l$ values are related by the multiplying coefficients $CI_n$ and $CQ_n$:

$$lI_k = \sum_n CI_n hI_{l-n} + \sum_n CQ_n hQ_{l-n}$$

$$lQ_k = \sum_n CQ_n hI_{l-n} - \sum_n CI_n hQ_{l-n}$$

(Equations 16)

It also follows that the sample values of the impulse response characteristics $m(t)$ and $p(t)$ are similarly related by the multiplying coefficients $CI_k$ and $CQ_k$:

$$mI_k = \sum_n CI_n pI_{l-n} + \sum_n CQ_n pQ_{l-n}$$

$$mQ_k = \sum_n cQ_n PI_{l-n} - \sum_n CI_n pQ_{l-n}$$

(Equations 17)

It will now be recalled that ideally $YI'_j$ equals $DI_j$ and $YQ'_j$ equals $DQ_j$. This desirable result is achieved if all values of $mQ_{-k}$ in Equations 14 are reduced to zero so that the DQ terms resulting from intersymbol interference are removed from the $YI'_j$ signal; and all DI terms, other than $DI_j$, resulting from intersymbol interference are removed from the $YI'_j$ signal. In other words, $YI'_j$ equals $DI_j$ if:

$$mI_{-k} = \begin{cases} 1 \text{ for } k = 0 \\ 0 \text{ otherwise} \end{cases}$$

$$mQ_{-k} = 0 \text{ for all } k$$

(Equations 18)

Note that with this result, the equalization network 67 has eliminated all intersymbol interference due to symmetrical attenuation and delay distortion, as shown by $mI_{-k}$ equals 1 for $k = 0$, and $mI_{-k}$ equals 0 otherwise. It has also eliminated all intersymbol interference due to asymmetrical attenuation and delay distortion as shown by $mQ_{-k}$ equals 0 for all $k$.

It is a purpose of the present invention to provide the multiplying coefficients $CI_k$ and $CQ_k$ with values corresponding to the conditions noted for the $m$ values in Equations 18. One means of accomplishing this desirable result is to transmit a known sequence of data from the transmitter 33 to the receiver 29 prior to the transmission of data.

In a preferred embodiment this special sequence of data includes the following symbols:

$$dI_j = \ldots +1, -1, +1, -1, +1, +1, -1, +1, -1, +1 \ldots$$

and $$dQ_j = \ldots +1, -1, +1, -1, +1, -1, +1, -1, +1, -1 \ldots$$

(Eqs. 19)

In general it should be noted that the special sequence of data includes in one of the I and Q channels a first series of alternating positive and negative integer values of equal level. This first series is shown by the $dQ_j$ values illustrated in Equations 19. The special sequence of data also includes in the other of the I and Q channels a second series of data followed by a third series of data wherein each of the second and third series includes alternating positive and negative integer values of equal level. The second series ends with and the third series begins with a positive integer value so that two positive integer values appear in juxtaposition in the other of the I and Q channels. The second and third series are shown by the data symbols $dI_j$ illustrated in Equations 19.

When the special sequence shown in Equations 19 is transmitted, the received symbols in the respective I and Q channels of the receiver 29 can be derived from Equations 4.

$$DI_j = \ldots 0, 0, 0, 0, 2, 0, 0, 0, 0 \ldots$$

and $$DQ_j = \ldots 0, 0, 0, 0, 0, 0, 0, 0, 0 \ldots$$

(Eqs. 20)

In general it is desirable that the special sequence transmitted provides the $DQ_j$ symbols with zero values. This can be accomplished by transmitting in the Q channel a series of data symbols $dQ_j$ defined by alternating positive and negative integer values of equal value. For example, this result would be achieved with the $dQ_j$ series +1, −1, +1, −1 illustrated as Equation 19 as well as the $dQ_j$ series +3, −3, +3, −3.

With respect to the $DI_j$ signal, it is desirable that the special sequence transmitted provides a particular integer value in a series of zero values. For example the particular number 2 illustrated in Equation 20 can be provided by transmitting the −1, +1, +1, −1 series shown in Equation 19. If the transmitted series includes the $dI_j$ values −3, +3, +3, −3, the particular number in the $DI_j$ signal will be 6. These particular numbers, which affect the gain of the associated $DI_j$ symbol, will vary with different embodiments of the invention.

With the $DI_j$ and $DQ_j$ symbols as indicated in Equations 20, it will be noted that the $DQ_j$ symbols all reduce to zero and Equations 11 can be simplified as follows:

$$XI_j = \sum_i DI_{j-i} pI_i$$

$$XQ_j = \sum_i -DI_{j-i} pQ_i$$

(Equations 21)

For a limited number of the $p$ values, these Equations 21 can be written as follows:

$$XI_j = DI_{j+2}pI_{-2} + DI_{j+1}pI_{-1} + DI_j pI_0 + DI_{j-1} pI_1 + DI_{j-2}pI_2$$

(Eqs. 22)

$$XQ_j = -DI_{j+2}pQ_2 = DI_{j+1}pQ_{-1} - DI_j pQ_0 - DI_{j-1} pQ_1 - DI_{j-2}pQ_2$$

In response to the particular sequence of $DI_j$ signals, these terms in the $XI_j$ and $XQ_j$ signal become:

$$XI_j = (0)pI_{-2} + (0) pI_{-1} + 2pI_0 + (0) pI_1 + (0)pI_2$$

$$XQ_j = -(0)pQ_{-2} - (0) pQ_{-1} - 2pQ_0 - (0) pQ_1 - (0)pQ_2$$

(Eqs. 23)

More specifically, at the times indicated, the $XI_j$ and $XQ_j$ signals will have the following values:

$$XI_{j+2} = 2pI_{-2}$$
$$XQ_{j+2} = -2pQ_{-2}$$
$$XI_{j+1} = 2PI_{-1}$$
$$XQ_{j+1} = -2PQ_{-1}$$
$$XI_j = 2pI_0$$
$$XQ_j = -2pQ_0$$
$$XI_{j-1} = 2pI_1$$
$$XQ_{j-1} = -2pQ_1$$
$$XI_{j-2} = 2pI_2$$
$$XQ_{j-2} = -2pQ_2 \quad \text{(Eqs. 24)}$$

where all $pQ_i$ and all $pI_i$ except $pI_0$ represent intersymbol interference caused by channel distortion.

As noted, the transmission of the special data sequence provides in the receiver 29 the symbols $DI_j$ and $DQ_j$ shown in Equations 20. A substitution of these values for DI and DQ into Equations 14 shows that:

$$YI_j = 2mI_k$$
$$YQ_j = -2mQ_k \quad \text{(Eqs. 25)}$$

If, prior to the transmission of the special data sequence, the $CI_n$ and $CQ_n$ taps are set so that $CI_0$ is equal to one and all other $CI_n$ equals zero, and all $CQ_n$ equals zero, then Equation 25 becomes:

$$YI_j = 2mI_0$$
$$YQ_j = -2mQ_0 \quad \text{(Eqs. 26)}$$

It follows that in response to the special data sequence, the output of the equalization network 67 can be expressed in general as follows:

$$YI_{j+k} = 2mI_k$$
$$YQ_{j+k} = -2mQ_k \quad \text{(Eqs. 27)}$$

As previously noted, it is desirable that the taps $CI_n$ and $CQ_n$ be adjusted so that $mI_k$ equals one for $k$ equal to zero and $mI_k$ equals zero for $k$ not equal to zero; and $mQ_k$ equals zero for all $k$.

The best solution for $CI_n$ and $CQ_n$, given the values for $pI_i$ and $pQ_i$, or $mI_k$ and $mQ_k$ is tedious and time consuming to calculate. Furthermore equalization networks of the past using normal adjustment procedures would require a number of seconds to converge on the required values. We have found that an excellent approximation of the desired result can be achieved for channels with relatively few large $pI_i$ and $pQ_i$ values, particularly if the maximum $pI_k$ and $pQ_k$ value is less than approximately 15% of the $pI_0$ value. This approximation gives an excellent result in a very short interval of time such as 5.8 milliseconds. In accordance with this rapid equalization technique, the $CI_n$ and $CQ_n$ values can be adjusted as follows:

$$CI_0 = mI_0 = 1.0$$
$$CI_n = -mI_k$$
$$CQ_0 = mQ_0 = 0$$
$$CQ_n = mQ_k \quad \text{(Eqs. 28)}$$

where the sub $n$ and sub $k$ terms run simultaneously, that is $CI_{-1} = -mI_{-1}$; $CQ_{-2} = mQ_{-2}$ etc.

Substituting Equations 27 into Equations 28 provides the following conclusions:

$$CI_n = \frac{-YI_{j+k}}{2}$$
$$CQ_n = \frac{+YQ_{j+k}}{2} \quad \text{(Equations 29)}$$

where $n$ and $k$ run simultaneously in accordance with the solution provided by Equations 28.

In the preceding Equations 29, the denominator 2 corresponds to the coefficient of the $mI_k$ and $mQ_k$ values in the Equations 27. This coefficient in turn corresponds to the particular number appearing in the DI signal shown in Equation 20. As previously noted, the special sequence may provide other integer values of equal magnitude such as the sequence:

$$DI_j = \ldots +3, -3, +3, -3, +3, +3, -3, +3, -3, +3 \quad \text{(Eqs. 30)}$$

and $$DQ_j = \ldots -3, +3, -3, +3, -3, +3, -3, +3, -3, +3 .$$

In this case, the particular number in the Equations 20 would be six, the coefficient in the Equations 27 would be six, and the divisor in the Equations 29 would also be six. It can be seen that any special sequence having the general characteristics previously mentioned can be used with the present invention. The different sequences would only have an effect upon the gain of the symbols $DI_j$ in the receiver 29.

The effectiveness of the approximate solution set forth in Equations 28 can best be shown with an example. Suppose that the telephone lines 23 provide the data symbols $dI_j$ and $dQ_j$ with the following intersymbol interferences:

$$pI_{-1} = 0.1$$
$$pI_0 = 1.0$$
$$pI_1 = -0.1$$
$$pQ_{-1} = 0.05$$
$$pQ_0 = 0$$
$$pQ_1 = -0.05 \quad \text{(Eqs. 31)}$$

Without equalization, the peak interference could be as much as $$0.1 + 0.1 + 0.05 + 0.05 = 0.3 \quad \text{(Eq. 32)}$$

The equalizer gain taps computed in accordance with the method of the present invention would be adjusted to the following values:

$$CI_{-1} = -0.1$$
$$CI_0 = 1$$
$$CI_1 = 0.1$$
$$CQ_{-1} = 0.05$$
$$CQ_0 = 0$$
$$CQ_1 = -0.05 \quad \text{(Eqs. 33)}$$

By virtue of Equations 27, the $m$ values at the output of the equalization network 67 would be as follows after this initial equalization:

$$mI_{-2} = -0.0075$$
$$mI_{-1} = 0$$
$$mI_0 = 1.015$$
$$mI_1 = 0$$
$$mI_2 = -0.0075$$
$$mQ_{-2} = 0.01$$
$$mQ_{-1} = 0$$
$$mQ_0 = -0.02$$
$$mQ_1 = 0$$
$$mQ_2 = 0.01 \quad \text{(Eqs. 34)}$$

From this result it can be seen that the peak interference is reduced from 0.3 to $$0.0075 + 0.0075 + 0.01 + 0.02 + 0.01 = 0.055 \quad \text{(Eqs. 35)}$$

Actually the intersymbol interference associated with the $mQ_0$ term would be essentially eliminated by the phase correction in the network 69 so that the effective peak interference reduction is from 0.3 to 0.035.

It will now be shown that this approximate solution provides excellent results not only in adjusting the $CI_n$ and $CQ_n$ taps initially but also in correcting a previous equalizer setting when the proper transmitter sequence is present.

Suppose that the channel intersymbol interference changes to the following values:

$$pI_{-1} = 0.08$$
$$pI_0 = 1.0$$
$$pI_1 = -0.08$$
$$pQ_{-1} = 0.04$$
$$pQ_0 = 0$$
$$pQ_1 = -0.04 \quad \text{(Eqs. 36)}$$

but that the equalizer settings remain as shown:

$$CI_{-1} = -0.1$$
$$CI_0 = 1.0$$
$$CI_1 = 0.1$$
$$CQ_{-1} = 0.05$$
$$CQ_0 = 0$$
$$CQ_1 = -0.05 \quad \text{(Eqs. 37)}$$

The new equalizer output response is:

$$mI_{-2} = -0.006$$
$$mI_{-1} = -0.02$$
$$mI_0 = 1.012$$
$$mI_1 = 0.02$$
$$mI_2 = -0.006$$
$$mQ_{-2} = -0.008$$

$$mQ_{-1} = -0.01$$
$$mQ_0 = 0.016$$
$$mQ_1 = 0.01$$
$$mQ_2 = -0.008 \qquad \text{(Eqs. 38)}$$

The new settings for the taps $CI_n$ in the next iteration $(t+1)$ can be simply obtained by subtracting the $mI_k$ value in the next iteration $(t+1)$ from the $CI_n$ value in the present iteration $(t)$. The new $CI_n$ values in the next iteration $(t+1)$ can be similarly derived by adding the $mQ_k$ value in the next iteration $(t+1)$ from the $EQ_n$ value in the present iteration $(t)$, as shown below:

$$CI_n(t+1) = CI_n(t) - mI_k(t+1)$$
and
$$CQ_n(t+1) = CQ_n(t) + mQ_k(t+1) \qquad \text{(Eqs. 36)}$$

Thus, the new settings are simply:
$$CI_{-1} = -0.08$$
$$CI_0 = 1.0$$
$$CI_1 = 0.08$$
$$CQ_{-1} = 0.04$$
$$CQ_0 = 0$$
$$CQ_1 = -0.04 \qquad \text{(Eqs. 40)}$$

which matches the new channel distortion.

The significant advantages of this fast equalization method can be provided by many different combinations of apparatus including that illustrated in FIGS. 2 and 4. In FIG. 2, it will be noted that the special sequence can actually be generated and transmitted by the transmitter 33 by providing a start-up sequence generator 102. An address detector 104 responds to the particular address of the associated slave station (such as the station 15) by providing a signal which is introduced through an ENABLE gate 106 to activate the inhibitor 39 and the generator 102. When activated, the inhibitor 39 prohibits data from the encoder 37 from entering the digital lowpass filters 41 and 43. While this data is inhibited, the generator 102 introduces into the respective I and Q channels the special data sequence which can be that shown in Equations 19. At the termination of the sequence, the ENABLE gate 106 discontinues the activation of the inhibitor 39 and the generator 102 so that normal data can be transmitted to the receiver 29.

Of initial interest in the implementation of the receiver 29 is the detection of the special data sequence. This is accomplished by the special sequence detection network 77 which can include a DI register 105 and DQ register 107. The DI register 105 sequentially receives the $DI_j$ symbols from the detector 71 and these symbols are compared with the special sequence in a sequence detector 109. Similarly the $DQ_j$ symbols can be introduced to the DQ register 107 and compared with a special sequence in the sequence detector 111. When the desired sequences appear in both the I and Q channels, signals from the detectors 109 and 111 activate an AND gate 112 which provides an ENABLE signal on the conductor 114.

To provide the desirable information shown in Equations 29, the $YI_j$ term can be introduced to a YI register 113. To further implement Equations 29, the $YI_j$ terms in the register 113 can be shifted one bit to the right to provide the quantity $YI_j/2$. The quantity $YQ_j$ can be similarly introduced to a YQ register 115 and shifted to provide the quantity $YQ_j/2$.

These quantities $YI_j/2$ and $YQ_j/2$ can be enabled through respective gates 116 and 118 of the enable signal on the conductor 114. Thus when the special sequence is detected, the quantity $YI_j/2$ is introduced to the negative terminal of a differential adder 119 and the quantity $YQ_j/2$ is introduced to one of the positive terminals of an adder 121. To implement Equations 39, the multiplying coefficients $CI_n$ and $CQ_n$ from the respective circulating registers 85 and 87 can be introduced to the remaining positive terminals of the adders 119 and 121 respectively. Finally, the corrected tap coefficients at the outputs of the adders 119 and 121 can be circulated into the respective registers 85 and 87.

From the foregoing discussion it is apparent that the equalization technique disclosed herein can be used for very fast initial channel learning as well as equalization updating during normal operation. The requirements for equalization are, however, that a special data sequence be transmitted. This can be easily arranged for initial channel learning by transmitting the desired sequence as a preamble prior to any data transmission. It will now be shown that this special sequence can actually occur with a high probability even in random data.

It can be seen that for the binary data shown below, there is a 50% probability that the partial response symbols $D_i$ will have a value of $\pm 2$, and a 50% probability the $D_i$ symbols will have a value of zero. In general, the probability of obtaining the desired sequence with random data in $(n)$ bauds is:

$$1 - \left(1 - \frac{1}{4^{mk-1}}\right)^n \qquad \text{(Equations 41)}$$

where
$mk$ is the total number of $mI_k$ terms, including $mI_0$ and $mQ_0$ that are required in both the $I$ and $Q$ channels.

For the example previously given, wherein the total number of taps is six, $mk$ equals six. In this specific case, the number of bauds of samples corresponding to a probability of 50% occurrence is approximately one thousand. That is, there is better than a 50% probability that the equalization network 67 can be updated evern one thousand symbols transmitted. This is faster updating than would normally be required. For example, the updating could be accomplished with a better than 50% probability every second. This is more than sufficient to track the characteristics of the telephone lines 23 which change relatively slowly, usually on a diurnal basis.

If the equalization characteristics of the receiver 29 are adjusted solely with reference to random data, the transmitter 33 need not include the following apparatus shown in FIG. 2: inhibitor 39, address detector 104, enable gate 106 and start up sequence generator 102. Of course in a particular embodiment, similar apparatus may be desirable to perform other functions substantially unrelated to equalization. For example, a start up sequence generator may be desirable to initially set the phase and timing of the receiver 29.

The equalization technique disclosed herein is of particular advantage not only in initially setting the taps of the equalization networks 67 prior to data transmission, but also in readjusting these taps during normal operation. In response to the transmission of the special sequence, the $CI_n$ and $CQ_n$ taps in the network 67 can be adjusted in a time interval equivalent to only approximately seven bauds. For initial fast learning, the special sequence can be transmitted by the transmitter 33 as shown in FIG. 2. For subsequent updating of the taps $CI_n$ and $CQ_n$, the special sequence can be detected in random data. Depending on the number of terms needed for the updating of a particular equalizer, the special sequence can occur with better than 50% probability in a period of only one thousand bauds.

Although the invention has been described with reference to a particular data sequence and a particular number of taps in the equalization network 67, it will be understood that these characteristics may vary widely in different embodiments of the invention. In addition, there will be many other variations of the implementation all within the scope of the present invention which will now be apparent to those of ordinary skill in the art. For this reason, the scope of the invention should be ascertained only with reference to the following claims.

We claim:

1. An apparatus for processing a random data signal comprising:
   equalizing means for equalizing the random data signal to provide a substantially equalized data signal, said equalizing means including variable gain means for subjecting the random data signal to at least one of a plurality of gains;
   partial response detector means for detecting the data in the equalized signal to provide a partial response data signal;
   means for detecting a first data sequence in the partial response data signal; and
   means responsive to the detection of said first data sequence in the partial response data signal for adjusting the variable gain means of the equalizer whereby the equalizer is rapidly adjusted using random data.

2. An apparatus as defined in claim 1 wherein said last mentioned means includes storage means for storing the substantially equalized signal.

3. An apparatus as defined in claim 1 wherein the first sequence includes at least one zero on each side of a number other than zero.

4. A method of adjusting an equalizer utilizing random data comprising:
   providing an equalizer having variable gain means for subjecting a signal to at least one of a plurality of gains;
   equalizing a random data signal with said equalizer to provide a substantially equalized random data signal;
   detecting the data in the random data signal to provide a detected random data signal;
   detecting the occurrence of a first sequence in the detected random data signal with said sequence including a number other than zero and at least one zero on at least one side of such number; and
   adjusting the variable gain means of the equalizer in repsonse to the occurrence in the detected random data signal of said first sequence whereby the equalizer is rapidly adjusted utilizing random data.

5. A method as defined in claim 4 wherein said variable gain means includes a plurality of tap coefficients and said step of adjusting includes combining the substantially equalized signal with at least one of the tap coefficients in response to said first sequence to provide a corrected tap coefficient and supplying the corrected tap coefficient to the equalizer.

6. A method as defined in claim 4 wherein said step of detecting is carried out to provide partial response detected data signals.

7. A method as defined in claim 6 wherein the first sequence includes at least one zero on each side of said number.

8. An apparatus for processing a demodulated data signal comprising:
   equalizing means for equalizing the demodulated data signal to provide a substantially equalized signal, said equalizing means including means for storing a plurality of different coefficients, said equalizing means being adapted to use the coefficients to equalize the demodulated data signal;
   storage means for storing the substantially equalized signal;
   detector means for detecting the data in the substantially equalized signal to provide a detected data signal;
   first means responsive to a first sequence in the detected data signal for combining the substantially equalized signal from the storage means therefor with at least one coefficient from the storage means therefor to provide a corrected coefficient; and
   means for introducing the corrected coefficient to said equalizing means whereby the equalizing means is adapted to the signal received by it.

9. A receiver adapted to receive an analog data signal comprising:
   means for sampling the analog data signal to provide a first signal in digital format;
   equalizing means for equalizing the first signal to provide a substantially equalized signal, said equalizing means including means for storing a plurality of different coefficients, said equalizing means being adapted to use the coefficients to equalize the first signal;
   storage means for storing the substantially equalized signal;
   detector means for detecting the data in the substantially equalized signal to provide a detected data signal;
   first means responsive to a first sequence in the detected data signal for combining the substantially equalized signal from the storage means therefor with at least one coefficient from the storage means therefor to provide a corrected coefficient; and
   means for introducing the correct coefficient to said equalizing means whereby the equalizing means is adapted to the signal received by it.

10. A receiver as defined in claim 9 wherein said storage means for the substantially equalized signal includes means for dividing the substantially equalized signal.

11. A receiver as defined in claim 9 including a phase correction network for receiving the equalized signal from the equalizing means and correcting the phase thereof to provide a second substantially equalized signal the phase of which has been substantially corrected, said storage means storing said second equalized signal and said detector means detecting the data in the second equalized signal.

12. A receiver as defined in claim 9 wherein said detector means includes a partial response detector.

13. A receiver as defined in claim 9 wherein said first sequence includes at least one zero.

14. A receiver as defined in claim 9 wherein said first sequence includes a series of zeros.

15. A receiver as defined in claim 9 wherein said first sequence includes at least one zero immediately on one side of a number other than zero.

16. A receiver as defined in claim 9 wherein said first means includes means for comparing the detected data signal with said first sequence, means for providing an enable signal when the first sequence appears in the detected data signal, and gate means responsive to the enable signal to control the output of the storage means.

17. A receiver as defined in claim 9 wherein the receiver has in-phase and quadrature channels, said first sequence includes a second sequence in said in-phase channel and a third sequence in said quadrature channel, said second and third sequences being different.

18. A receiver as defined in claim 17 wherein one of said second and third sequences comprises a series of zeros and the other of said second and third sequences comprises a number other than zero and zeros on both sides of said number.

19. A receiver as defined in claim 9 wherein said storage means for the equalized signal includes means for dividing the equalized signal, said detector means includes a partial response detector, and said first sequence includes at least one zero.

* * * * *